(12) United States Patent
Stewart et al.

(10) Patent No.: US 11,599,856 B1
(45) Date of Patent: Mar. 7, 2023

(54) APPARATUSES AND METHODS FOR PARSING AND COMPARING VIDEO RESUME DUPLICATIONS

(71) Applicant: MY JOB MATCHER, INC., Austin, TX (US)

(72) Inventors: Arran Stewart, Austin, TX (US); Steve O'Brien, Raleigh, NC (US)

(73) Assignee: MY JOB MATCHER, INC., Austin, TX (US)

( * ) Notice: Subject to any disclaimer, the term of this patent is extended or adjusted under 35 U.S.C. 154(b) by 0 days.

(21) Appl. No.: 17/582,070

(22) Filed: Jan. 24, 2022

(51) Int. Cl.
*G06F 16/00* (2019.01)
*G06Q 10/1053* (2023.01)
*G06F 16/75* (2019.01)
*G06V 10/74* (2022.01)

(52) U.S. Cl.
CPC ......... *G06Q 10/1053* (2013.01); *G06F 16/75* (2019.01); *G06V 10/761* (2022.01)

(58) Field of Classification Search
None
See application file for complete search history.

(56) References Cited

U.S. PATENT DOCUMENTS

| | | | |
|---|---|---|---|
| 8,548,929 B1 | 10/2013 | Goodwin et al. | |
| 8,799,236 B1 | 8/2014 | Azari et al. | |
| 8,830,331 B2 | 9/2014 | Haritaoglu | |
| 9,135,674 B1 | 9/2015 | Yagnik et al. | |
| 10,853,767 B1 * | 12/2020 | Lawrence | G06Q 10/1053 |
| 2009/0028517 A1 | 1/2009 | Shen et al. | |
| 2009/0052784 A1 | 2/2009 | Covell et al. | |
| 2011/0208744 A1 | 8/2011 | Chandiramani et al. | |
| 2015/0332124 A1 | 11/2015 | Yang et al. | |
| 2017/0293803 A1 | 10/2017 | Smetanin | |
| 2021/0203997 A1 * | 7/2021 | Veselov | G06V 10/764 |
| 2021/0281891 A1 | 9/2021 | Srivastava et al. | |

FOREIGN PATENT DOCUMENTS

| | | |
|---|---|---|
| CN | 109740147 A | 5/2019 |
| CN | 110209659 A | 9/2019 |
| CN | 110413742 A | 11/2019 |

(Continued)

OTHER PUBLICATIONS

Laurent Nguyen et al. Hirability in the Wild: Analysis of Online Conversational Video Resumes. IEEE Transactions on Multimedia, vol. 18, No. 7, Jul. 2016.*

(Continued)

*Primary Examiner* — Tuankhanh D Phan
(74) *Attorney, Agent, or Firm* — Caldwell Intellectual Property Law

(57) ABSTRACT

Aspects relate to apparatuses and methods for parsing and comparing resume video duplications. An exemplary apparatus includes a processor configured to acquire a plurality of video elements from a target video resume, wherein the target video resume includes at least an image component, compare at least an existing video resume and the target video resume to obtain a comparison result, and determine, as a function of the comparison result, a duplication coefficient for the target resume video, wherein the duplication coefficient relates to a similarity between the target video and at least and existing resume video.

18 Claims, 10 Drawing Sheets

(56) References Cited

FOREIGN PATENT DOCUMENTS

| CN | 110738128 A | 1/2020 |
|---|---|---|
| CN | 111046227 A | 4/2020 |

OTHER PUBLICATIONS

Hugo Escalante et al. Sep. 2019. Explaining First Impressions: Modeling, Recognizing, and Explaining Apparent Personality from Videos.*

Byun, Sung-Woo; Lee, Seok-Pil, Stochastic Non-linear Hashing for Near-Duplicate Video Retrieval using Deep Feature applicable to Large-scale Datasets, Aug. 31, 2019.

Anindya Sarkar, Vishwarkarma Singh, Pratim Ghosh, B. S. Manjunath, Ambuj Singh, Efficient and Robust Detection of Duplicate Videos in a Large Database, Nov. 18, 2021.

* cited by examiner

APPARATUSES AND METHODS FOR PARSING AND COMPARING VIDEO RESUME DUPLICATIONS

FIELD OF THE INVENTION

The present invention relates to the field of selective visual display apparatuses. In particular, the present invention is directed to apparatuses and methods for parsing and comparing resume video duplications.

BACKGROUND

Video content (including short-form video content) has steadily been rising in popularity for many years. Its advantages as a communication medium are manifest. However, present ways of doing business, which are commonly reliant upon the written word, are not capable of making optimal use of this form of media.

SUMMARY OF THE DISCLOSURE

In an aspect, an apparatus for parsing and comparing resume video duplications including a computing device configured to acquire a plurality of video elements from a target video resume, wherein the target video resume includes at least an image component, compare at least an existing video resume and the target video resume to obtain a comparison result, and determine, as a function of the comparison result, a duplication coefficient for the target resume video, wherein the duplication coefficient relates to a similarity between the target video resume and at least an existing resume video.

In another aspect, a method of parsing and comparing resume video duplications includes acquiring, using a computing device, a plurality of video elements from a target video resume, wherein the target video includes at least an image component, comparing, using the computing device, at least an existing video resume and the target video resume to obtain a comparison result, and determining, using the computing device, as a function of the comparison result, a duplication coefficient for the target resume video, wherein the duplication coefficient relates to a similarity between the target video resume and at least an existing resume video.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for parsing and comparing resume video duplications.

Aspects of the present disclosure can be used to automatically analyze and sort applicants according to their resume video. Aspects of the present disclosure can also be used to add appeal to a job application. This is so, at least in part, because information request in sorting an applicant is inherently present within a video resume. However, no apparatus presently facilitates the automatic sorting of applicant based upon their video resumes.

Aspects of the present disclosure allow for practical improvement over current state of art for applicant sorting by allowing for video data to be parsed and compared to identify redundancies in stored information. Exemplary embodiments illustrating aspects of the present disclosure are described below in the context of several specific examples.

Figure 1:
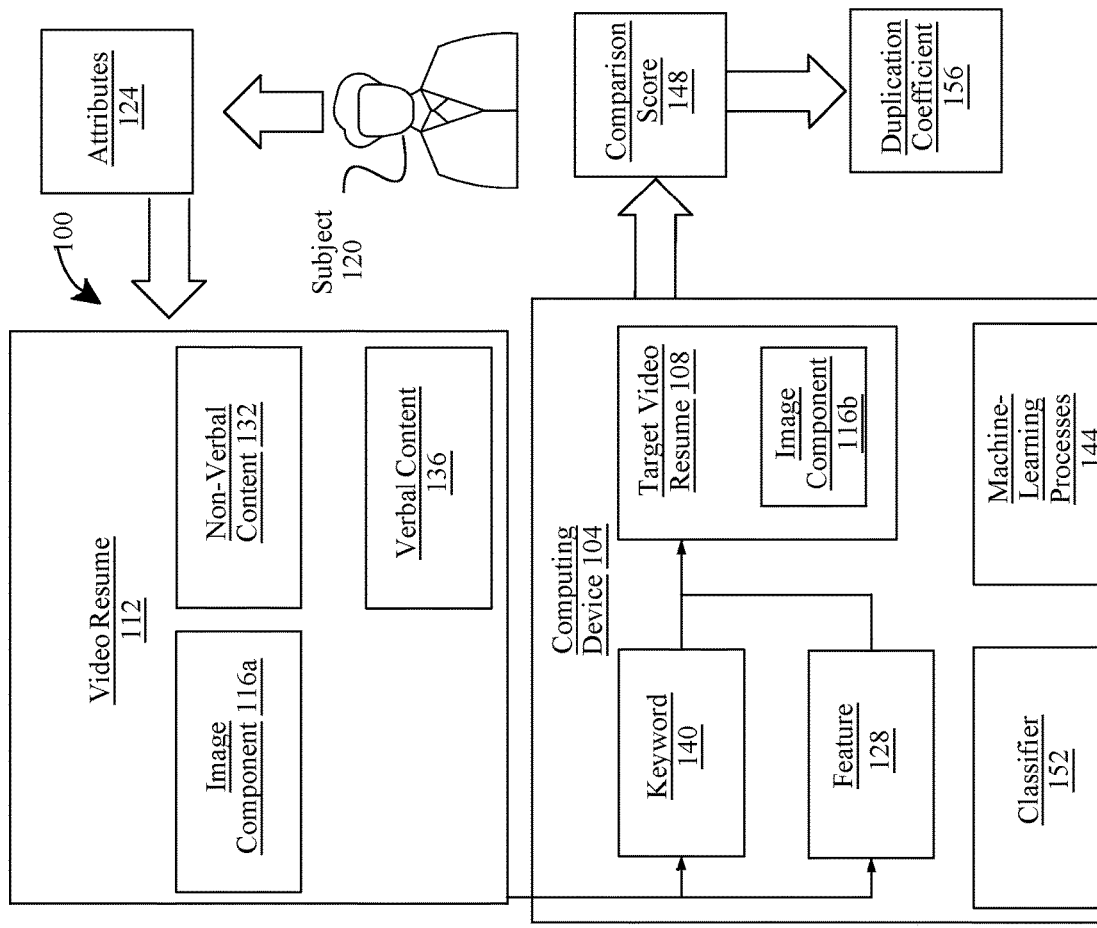
FIG. 1 is a block diagram of an exemplary apparatus for parsing and comparing video resume content to target video resume content.

Referring now to FIG. 1, an exemplary embodiment of apparatus 100 for parsing and comparing resume video duplications is illustrated. Apparatus 100 includes computing device 104. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of apparatus 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 104 is configured to acquire a plurality of video elements from a target video resume 108. As used in this disclosure, "video elements" are diverse types of features from a video resume such as image features, frame features, sound features, graphical features, and the like. As used in this disclosure, a "video resume" is a video in visual and/or audio form to provide a recording promoting a jobseeker. In some cases, video resume 112 may include content that is representative or communicative of at least attribute 124 of subject 120. As used in this disclosure, a "subject" is a person, for example a jobseeker. Subject 120 may be represented directly by video resume 112. For example, in some cases, image component 116a may include an image of subject 120. As used in this disclosure, an "image component" may be a visual representation of information, such as a plurality of temporally sequential frames and/or pictures, related to video resume and target video resume. For example, image component 116a-b may include animations, still imagery, recorded video, and the like. Attributes 124 may include subject's 120 skills, competencies, credentials, talents, and the like. In some cases, attributes 124 may be explicitly conveyed within video resume 112. Alternatively, or additionally, in some cases, attributes 124 may be conveyed implicitly with video resume 112.

As used in this disclosure, a "target video resume" includes at least image component 116b that may be selected based on a request by a user or job-applicant from one or more databases in which multiple video resumes 112 of users or job-applicants are stored. Target video resume 108 may be the basis for computing device 104 to search for other video resumes 112 based on target resume 108 video properties. Video elements from target video 108 may relate to diverse types of features of target video resume 108. As used in this disclosure, a "feature" is an individually measurable property or characteristic such as image feature, frame feature, sound feature, graphical feature, and textual feature. These features may be in the form of a floating-point number feature, a binarized feature, a fence feature, a recall feature, a pooling feature, a reranking feature, and the like. Target video resume 108 may be communicated by way of digital signals, for example between computing devices which are communicatively connected with at least a wireless network. Digital video may be compressed to optimize speed and/or cost of transmission of video. Videos may be compressed according to a video compression coding format (i.e., codec). Exemplary video compression codecs include H.26x codecs, MPEG formats, VVC, SVT-AV1, and the like. In some cases, compression of a digital video may be lossy, in which some information may be lost during compression. Alternatively, or additionally, in some cases, compression of a digital video may be substantially lossless, where substantially no information is lost during compression.

Still referring to FIG. 1, Video resume 112 may be representative subject-specific data. As used in this disclosure, "subject-specific data" is any element of information that is associated with a specific subject. Exemplary forms of subject-specific data include image component 116a-b, video resume 112, non-verbal content 132, verbal content 136, audio component, as well as any information derived directly or indirectly from video resume 112 or any other subject-specific data. For example, subject-specific data could be the physical properties of subject 120, such as their body posture or facial expression. Subject-specific data could also be audio sensory properties of subject 120, such as tone of voice or background audio in a resume video 112.

In some cases, video resume 112 may include non-verbal content 132. As used in this disclosure, "non-verbal content" is all communication that is not characterized as verbal content. As used in this disclosure, "verbal content" is comprehensible language-based communication. For example, verbal content may include "visual verbal content" which is literal and/or written verbal content. Non-verbal content 132 includes all forms of communication which are not conveyed with use of language. Exemplary non-verbal content may include change in intonation and/or stress in a speaker's voice, expression of emotion, and the like. For example, in some cases, non-verbal content may include visual non-verbal content. As used in this disclosure, "visual non-verbal content" is non-verbal content 132 that is visually represented. In some cases, visual non-verbal content may be included within video resume 112 by way of image component 116a.

In some cases, a non-verbal classifier may classify non-verbal content 132 present in one or more image component 116a to one or more of target video resume 108, a feature. Non-verbal classifier may include a number of classifiers, for example each being tasked with classifying a particular attribute 124 or form of non-verbal content 132. For example, in some cases, non-verbal classifier may classify a video resume 112 and related subject 120 as associated with a feature representative of 'personable.' Non-verbal classifier may include another specialized visual non-verbal classifier to classify visual non-verbal content as appearing 'personable' that is, for example, as having appropriate posture, facial expressions, manner of dress, and the like. In some cases, classifier may include or a constituent part of tree structure, for making associations based upon video resume.

With continued reference to FIG. 1, in some embodiments, image component 116a-b may include or otherwise represent verbal content 136. For instance, written or visual verbal content may be included within image component 116a-b. Visual verbal content may include images of written text represented by image component 116a-b. For example, visual verbal content may include, without limitation, digitally generated graphics, images of written text (e.g., typewritten, and the like), signage, and the like.

Still referring to FIG. 1, in some embodiments, image component 116a-b may include or otherwise represent audible verbal content related to at least an attribute 124 of subject 120. As used in this disclosure, "audible verbal content" is oral (e.g., spoken) verbal content. In some cases, audible verbal content may be included within video resume 112 by way of an audio component. As used in this disclosure, an "audio component" is a representation of audio, for example a sound, a speech, and the like. In some cases, verbal content 136 may be related to at least an attribute of subject. Additionally, or alternatively, visual verbal content and audible verbal content may be used as inputs to classifiers as described throughout this disclosure.

In some cases, computing device 104 may include audio-visual speech recognition (AVSR) processes to recognize verbal content 136 in video resumes 112. For example, computing device 104 may use image content 116a-b to aid in recognition of audible verbal content such as viewing subject 120 move their lips to speak on video to process the audio content of video resume 112. AVSR may use image component 116a-b to aid the overall translation of the audio verbal content of video resumes 112. In some embodiments, AVSR may include techniques employing image processing capabilities in lip reading to aid speech recognition processes. In some cases, AVSR may be used to decode (i.e., recognize) indeterministic phonemes or help in forming a preponderance among probabilistic candidates. In some cases, AVSR may include an audio-based automatic speech recognition process and an image-based automatic speech recognition process. AVSR may combine results from both processes with feature fusion. Audio-based speech recognition process may analysis audio according to any method described herein, for instance using a Mel frequency cepstrum coefficients (MFCCs) and/or log-Mel spectrogram derived from raw audio samples. Image-based speech recognition may perform feature recognition to yield an image vector. In some cases, feature recognition may include any feature recognition process described in this disclosure, for example a variant of a convolutional neural network. In some cases, AVSR employs both an audio datum and an image datum to recognize verbal content 136. For instance, audio vector and image vector may each be concatenated and used to predict speech made by a subject 120, who is 'on camera.'

In some cases, computing device 104 may be configured to recognize at least a keyword 140 as a function of visual verbal content. In some cases, recognizing at least keyword 140 may include optical character recognition. As used in this disclosure, a "keyword" is an element of word or syntax used to identify and/or match elements to each other. In some cases, computing device 104 may transcribe much or even substantially all verbal content 136 from target resume video 108.

Still refereeing to FIG. 1, in some embodiments, optical character recognition or optical character reader (OCR) includes automatic conversion of images of written (e.g., typed, handwritten or printed text) into machine-encoded text. In some cases, recognition of at least a keyword 140 from an image component 116a-b may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component 116a-b. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to Image component 116a-b to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into at least a feature 128. Exemplary non-limiting features may include corners, edges, lines, closed loops, line direction, line intersections, and the like. In some cases, feature extraction may reduce dimensionality of representation and may make the recognition process computationally more efficient. In some cases, extracted feature 128 may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIG. 6. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, Calif., United States.

Still referring to FIG. 1, in some cases, OCR may employ a two-pass approach to character recognition. A first pass may try to recognize a character. Each character that is satisfactory is passed to an adaptive classifier as training data. The adaptive classifier then gets a chance to recognize characters more accurately as it further analyzes image components. Since the adaptive classifier may have learned something useful a little too late to recognize characters on the first pass, a second pass is run over the image components. Second pass may include adaptive recognition and use characters recognized with high confidence on the first pass to recognize better remaining characters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, Still referring to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1, acquiring plurality of video elements may include identifying a series of frames of target video resume 108, identifying a corresponding series of frames of at least an existing video resume 112, and comparing the series of frames of target video resume 108 to existing video resume 112. An existing video resume is video resume 112 that has been uploaded to a video resume database. The series of frames may include a group of pictures having some degree of internal similarity, such as a group of pictures representing a scene. In some embodiments, comparing series of frames may include video compression by inter-frame coding. The "inter" part of the term refers to the use of inter frame prediction. This kind of prediction tries to take advantage from temporal redundancy between neighboring frames enabling higher compression rates. Video data compression is the process of encoding information using fewer bits than the original representation. Any compression is either lossy or lossless. Lossless compression reduces bits by identifying and eliminating statistical redundancy. No information is lost in lossless compression. Lossy compression reduces bits by removing unnecessary or less important information. Typically, a device that performs data compression is referred to as an encoder, and one that performs the reversal of the process (decompression) as a decoder. Compression is useful because it reduces the resources required to store and transmit data. Computational resources are consumed in the compression and decompression processes. Data compression is subject to a space-time complexity trade-off. For instance, a compression scheme for video may require expensive hardware for the video to be decompressed fast enough to be viewed as it is being decompressed, and the option to decompress the video in full before watching it may be inconvenient or require additional storage. Video data may be represented as a series of still image frames. Such data usually contains abundant amounts of spatial and temporal redundancy. Video compression algorithms attempt to reduce redundancy and store information more compactly.

Still referring to FIG. 1, inter-frame coding works by comparing each frame in the video with the previous one. Individual frames of a video sequence are compared from one frame to the next, and the video compression codec sends only the differences to the reference frame. If the frame contains areas where nothing has moved, the system can simply issue a short command that copies that part of the previous frame into the next one. If sections of the frame move in a simple manner, the compressor can emit a (slightly longer) command that tells the decompressor to shift, rotate, lighten, or darken the copy. Usually, the encoder will also transmit a residue signal which describes the remaining more subtle differences to the reference imagery. Using entropy coding, these residue signals have a more compact representation than the full signal. In areas of video with more motion, the compression must encode more data to keep up with the larger number of pixels that are changing. As used in this disclosure, reference frames are frames of a compressed video (a complete picture) that are used to define future frames. As such, they are only used in interframe compression techniques. Some modern video encoding standards, such as H.264/AVC, allow the use of multiple reference frames. This allows the video encoder to choose among more than one previously decoded frame on which to base each macroblock in the next frame. While the best frame for this purpose is usually the previous frame, the extra reference frames can improve compression efficiency and/or video quality. The two frame types used in inter-fame coding is P-frames and B-frames. A P-frame (Predicted picture) holds only the changes in the image from the previous frame. For example, in a scene where a car moves across a stationary background, only the car's movements need to be encoded. The encoder does not need to store the unchanging background pixels in the P-frame, thus saving space. A B-frame (Bidirectional predicted picture) saves even more space by using differences between the current frame and both the preceding and following frames to specify its content. An inter coded frame is divided into blocks known as macroblocks. A macroblock is a processing unit in image and video compression formats based on linear block transforms, typically the discrete cosine transform (DCT). A macroblock typically consists of 16×16 samples, and is further subdivided into transform blocks, and may be further subdivided into prediction blocks. Formats which are based on macroblocks include JPEG, where they are called MCU blocks, H.261, MPEG-1 Part 2, H.262/MPEG-2 Part 2, H.263, MPEG-4 Part 2, and H.264/MPEG-4 AVC. After the inter coded frame is divided into macroblocks, instead of directly encoding the raw pixel values for each block, the encoder will try to find a block similar to the one it is encoding on a previously encoded frame, referred to as a reference frame. This process is done by a block matching algorithm. If the encoder succeeds on its search, the block could be encoded by a vector, known as motion vector, which points to the position of the matching block at the reference frame. The process of motion vector determination is called motion estimation. In most cases the encoder will succeed, but the block found is likely not an exact match to the block it is encoding. This is why the encoder will compute the differences between them. Those residual values are known as the prediction error and need to be transformed and sent to the decoder. To sum up, if the encoder succeeds in finding a matching block on a reference frame, it will obtain a motion vector pointing to the matched block and a prediction error. Using both elements, the decoder will be able to recover the raw pixels of the block. For example, video resumes 112 and 108 may be compressed using a P-frame algorithm and broken down into macroblocks. Individual still images taken from video resume 112 can then be compared against a reference frame taken from target video resume 108. A P-frame from video resume 112 would only hold the changes in image from target video resume 108. For example, if both video resumes 112 and 108 include a subject 120 speaking in a similar manner, then what would be encoded and stored would be subtle changes such as a foreign object entering the background of video resume 112 compared to no foreign object in the background of the reference frame from target video resume 108. Exemplary video compression codecs include without limitation H.26x codecs, MPEG formats, VVC, SVT-AV1, and the like. In some cases, compression may be lossy, in which some information may be lost during compression. Alternatively, or additionally, in some cases, compression may be substantially lossless, where substantially no information is lost during compression. In some cases, image component 116a-b may include a plurality of temporally sequential frames. In some cases, each frame may be encoded (e.g., bitmap or vector-based encoding). Each frame may be configured to be displayed by way of a display. Exemplary displays include without limitation light emitting diode (LED) displays, cathode ray tube (CRT) displays, liquid crystal displays (LCDs), organic LEDs (OLDs), quantum dot displays, projectors (e.g., scanned light projectors), and the like.

With continued reference to FIG. 1, computing device 104 is configured to compare at least existing video resume 112 and target video resume 108 to obtain a comparison result. An initial pass may be used by computing device 104 to sort elements of video resumes 112 into categories, and a subsequent pass may involve detailed comparison of category-matched video elements from at least two video resumes 112 to one another. For example, the initial pass may include classifying the plurality of existing video resumes 112 based on, image component 116a, audio component, attributes 124, or at least identifying subject 120 indica. For example, identifying indica could include name of user or subject 120, account number, social security number, telephone number, address, and the like. In some embodiments, computing device 104 may utilize a candidate classifier, which may include any classifier used throughout this disclosure, to run an initial pass over the video elements of video resumes 112, break down and categorizes such elements before comparing it to target video resume 108. A "classifier," as used in this disclosure is a machine-learning model, such as a mathematical model, neural net, or program generated by a machine learning algorithm known as a "classification algorithm that sorts inputs into categories or bins of data, outputting the categories or bins of data and/or labels associated therewith. A classifier may be configured to output at least a datum that labels or otherwise identifies a set of data that are clustered together, found to be close under a distance metric, or the like. As used in this disclosure, a "candidate classifier" is a classifier that classifies subjects 120 to target video resume 112 or an overall job description. In some cases, candidate classifier may include a trained machine-learning model, which is trained using candidate training data. As used in this disclosure, "candidate training data" is a training data that correlates one or more of subjects 120, subject-specific data, and subject attributes 124 to one or more job descriptions, description-specific data, and job description data. As used in this disclosure, a "job description datum" is an element of information associated with a job description. Target video resume 108 may be representative of such job descriptive data. For example, in the initial pass, video resumes 112 may be categorized based on subject's 120 attributes 124 such as credentials. As used in this disclosure, "credentials" are any piece of information that indicates an individual's qualification to perform a certain task or job. All existing video resumes 112 may be grouped based on level of experience, educational history, certifications, and the like.

Still referring to FIG. 1, after the initial pass, during the subsequent pass, two or more existing video resumes 112 may be compared against one another and ranked based on similarity or relevance to target video resume 108 before an overall comparison result of video resumes 112 and target video 108 is computed. As used in this disclosure, "relevance" is a measure of closeness of association. For example, if candidate classifier grouped video resumes 112 together based on years of experience, candidate classifier may then compare the video resumes in that group to output a relevance metric of video resumes 112 that most align with target video 108. In some cases, relevance metric may be a quantified metric, for example in arbitrary units or relative unit (e.g., percent).

Still referring to FIG. 1, in some embodiments, after the initial and subsequent pass are ran, computing device may utilize the data gathered from the candidate classifier to calculate an overall comparison score of existing video resumes 112 to target video resume 108. In some cases, comparison result may contain a comparison score 148 that represents a degree of similarity between target video resume 108 and existing video resume 112 of the plurality of existing video resumes. Comparison score 148 may be determined by dynamic time warping (DTW) based on a similarity matrix. Dynamic time warping may include algorithms for measuring similarity between two sequences, which may vary in time or speed. For instance, similarities in walking patterns may be detected, even if in one video the person was walking slowly and if in another he or she were walking more quickly, or even if there were accelerations and deceleration during one observation. DTW has been applied to video, audio, and graphics—indeed, any data that can be turned into a linear representation can be analyzed with DTW. In some cases, DTW may allow computing device 104 to find an optimal match between two given sequences (e.g., time series) with certain restrictions. That is, in some cases, sequences can be "warped" non-linearly to match each other.

With continued reference to FIG. 1, in some embodiments, computing device 104 may extract or otherwise recognize at least feature 128 from video resume 112. Feature 128 may be recognized and/or extracted from image component 116a of existing video resumes 112. In some cases, features 128 may be recognized, which are associated with non-verbal content 132. For example, in some cases, visual non-verbal content such as expression of subject's 120 emotion may be represented by a number of features 128 which are readily extracted from image component 116a of existing video resumes 112. In some cases, recognition and/or extraction of features 128 from image component 116a may include use of machine vision techniques.

Still referring to FIG. 1, in some embodiments, apparatus 100 may include a machine vision process. A machine vision process may use image component 116a from video resume 112, to make a determination about verbal 136 and/or non-verbal content 132. For example, in some cases a machine vision process may be used for world modeling or registration of objects within a space. In some cases, registration and/or feature recognition may include image processing, such as without limitation object recognition, feature 128 detection, edge/corner detection, and the like. Non-limiting example of feature detection 128 may include scale invariant feature transform (SIFT), Canny edge detection, Shi Tomasi corner detection, and the like. In some cases, a machine vision process may operate image classification and segmentation models, such as without limitation by way of machine vision resource (e.g., OpenMV or TensorFlow Lite). A machine vision process may detect motion, for example by way of frame differencing algorithms. A machine vision process may detect markers, for example blob detection, object detection, face detection, and the like. In some cases, a machine vision process may perform eye tracking (i.e., gaze estimation). In some cases, a machine vision process may perform person detection, for example by way of a trained machine learning model. In some cases, a machine vision process may perform motion detection (e.g., camera motion and/or object motion), for example by way of optical flow detection. In some cases, machine vision process may perform code (e.g., barcode) detection and decoding. In some cases, a machine vision process may additionally perform image capture and/or video recording.

Still referring to FIG. 1, in some cases, machine vision process may perform pose-estimation for example to ascertain a relative location or movement of objects within existing video resumes to include one or more transformations, for example to a view of a frame (or an image or existing video resumes) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; image recognition and/or edge detection software may be used to detect multiple views of images of an object (from subsequent frames) to derive a relative position along a third (z) axis. In some cases, solicitation video may include a stereo image, having two stereoscopic views, which may be compared to derive z-axis values of points on object permitting, for instance, derivation of further z-axis points within and/or around the object using interpolation. Alternatively, or additionally, relative movement within Image component 116 (e.g., frame to frame) may be used to ascertain positions of objects, even along a z-axis, for instance by way of kinetic parallax. In some cases, relative motion of objects further away may occur at a different speed than objects nearby, this phenomenon may be used to ascertain a position of objects relative a camera, for example when the camera is moving. Object recognition and pose estimation may be repeated with multiple objects in field of view, including without a subject. In an embodiment, x and y axes may be chosen to span a plane common to a field of view of a camera used for solicitation video image capturing and/or an xy plane of a first frame; a result, x and y translational components and ϕ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level.

Still referring to FIG. 1, in some cases, a machine vision process may use at least an image classifier, or any classifier described throughout this disclosure. As a non-limiting example, a machine vision process may use an image classifier, wherein the input is image component 116a of video resumes 112, and through a classification algorithm, outputs image components 116a into categories based on training data, such as sequential video resume 112 frames that match target video resume 108. Computing device 104 and/or another device may generate a classifier using a classification algorithm, defined as a process whereby a computing device derives a classifier from training data. Classification may be performed using, without limitation, linear classifiers such as without limitation logistic regression and/or I Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A) \div P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate classifier 152 using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\Sigma_{i=0}^{n} a_i^2}$, where $a_i$ is attribute number I of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, in some cases, computing device associate subject 120 with at least feature 128 from the target video resume 108 by performing a text retrieval process as a function of at least keyword 140. For example, in some cases, computing device 104 may query feature 128 from target video resume 108 for presence of at least keyword 140. Querying feature 128 from target video resume 108 may include one or more of word searching, phrase searching, proximity searching, full-text searching, field (or metadata) searching, and the like. As used in this disclosure, a "target video feature keyword" is a word that is of particular relevance to an individual feature of target video resume.

With continued reference to FIG. 1, in some embodiments, querying at least image component 116a-b may be performed with a text search, for example using at least keyword 140 as a search term. Text search may include techniques for searching a single computer-stored document or a collection of documents, for example in a database. Text search may include full-text search. Full-text search may be distinguished from searches based on metadata or on field-based searching (e.g., fields such as titles, abstracts, selected sections, or bibliographical references). In an exemplary full-text search, computing device 104 may examine all words in every stored document as it tries to match search criteria (for example, keywords). Alternatively, a text search may be limited to fields, such as with field-based searching.

Still referring to FIG. 1, in some embodiments, text searching may include querying a database of video resumes in which multiple video resumes 112 of subjects 120 are stored. As used in this disclosure, "video resume database" is a data structure configured to store data associated with a plurality of video resumes [ . . . ]. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. In some cases, querying of at least a video element may include any number of querying tools, including without limitation keywords (as described above), field-restricted search, Boolean queries, phrase search, concept search, concordance search, proximity search, regular expression, fuzzy search, wildcard search, and the like. In some cases, keywords may be used to perform a query. In some cases, a document (or trained indexers) may supply a list of words that describe subject of the document, including without limitation synonyms of words that describe the subject. In some cases, keywords may improve recall, for instance if the keyword list includes a keyword that is not in text of a document. In some cases, querying tools may include field-restricted search. A field-restricted search may allow a queries scope to be limited to within a particular field within a stored data record, such as "Title" or "Author." In some cases, a query tool may include Boolean queries. Searches that use Boolean operators (for example, "encyclopedia" AND "online" NOT "Encarta") can dramatically increase precision of a search. In some cases, an AND operator may say, in effect, "Do not retrieve any document unless it contains both of these terms." In some cases, a NOT operator may say, in effect, "Do not retrieve any document that contains this word." In some cases, a retrieval list retrieving too few documents, may prompt and OR operator to be used in place of an AND operator to increase recall; consider, for example, "encyclopedia" AND "online" OR "Internet" NOT "Encarta". This search will retrieve documents about online encyclopedias that use the term "Internet" instead of "online." In some cases, search precision and recall are interdependent and negatively correlated in text searching. In some cases, a query tool may include phrase search. In some cases, a phrase search may match only those documents that contain a specified phrase. In some cases, a query tool may include a concept search. In some cases, a concept search may be based on multi-word concepts, for example compound term processing. In some cases, a query tool may include a concordance search. In some cases, a concordance search may produce an alphabetical list of all principal words that occur in a text and may include their immediate context. In some cases, a query tool may include a proximity search. In some cases, a proximity search matches only those documents that contain two or more words that are separated by a specified number of words, are in the same sentence, or an in the same paragraph. A query tool may include a regular expression. In some cases, a regular expression may employ a complex but powerful querying syntax that can be used to specify retrieval conditions with precision, for instance database syntax. A query tool may include a fuzzy search. In some cases, a fuzzy search may search for a document that matches given terms while allowing for some variation around them. In some cases, a query tool may include a wildcard search. In some cases, a wildcard search may substitute one or more characters in a search query for a wildcard character such as an asterisk. For example, using a wildcard, such as an asterisk, in a search query "s*n" will search for terms inclusive of "sin," "son," "sun," and the like.

Still referring to FIG. 1, in some cases association of existing video resume 112 with at least target video resume 108 may include one or more of machine-learning process 144 and/or classifiers 152. Machine-learning process 144 may include any machine-learning process described in this disclosure. Classifier 152 may include any classifier described in this disclosure. In some cases, computing device 104 may associate existing video resume 112 with at least keyword 140 as a function of at least feature 128. As described above, at least feature 128 may represent non-verbal content 132 from existing video resume 112, at least feature 128 may be correlated to at least target video resume 108, for example by way of one or more models (e.g., machine-learning models). In some cases, computing device 104 associate video resume 112 with at least target video resume 108 by correlating, matching, or otherwise comparing subject-specific data with description-specific data. In some cases, one or both of subject-specific data and description-specific data may be at least partially represented by features 128 which are inputs and/or outputs of machine-learning processes. For example, a machine-learning model may be trained with deterministic or historical subject-specific data correlated to description-specific data.

Still referring to FIG. 1, as a function of the comparison result, a ranking of the plurality of existing resume videos may be generated. In some cases, generating the ranking of the plurality of existing resumes may include linear regression techniques. Computing device 104 may be designed and configured to create a machine-learning model using techniques for development of linear regression models.

Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 1, computing device 104 may be configured to determine, as a function of the comparison result, a duplication coefficient 156 for target resume video 108. As used in this disclosure, "duplication coefficient" is a quantitative value of observed similarities between two or more video resumes. Duplication coefficient 156 may be calculated or computed to provide a measure or metric of similarity between target video resume 108 and at least existing resume video 112. Duplication coefficient 156 could stand for "how much", "how many" or "how often" data appears in video resumes 112. The different categories of quantitative data could include, measurements, counts, calculations, sensors, projections, quantification of qualitive data, and the like. For example, duplication coefficient 156 may be the average of the observed subject-specific data duplications of existing video resumes, divided by the total number of existing video resumes 112 in a database. Other examples, duplication coefficient could measure the number of subjects 120 appearing per video resume 112. Duplication coefficient 156 could quantify how many subjects 120 answered an interview question. Duplication coefficient could count subjects 120 having similar technical backgrounds to target video resume 108. Another example, duplication coefficient 156 could project subjects 120 most qualified for a position based on their video resumes. In some embodiments, duplication coefficient 156 may include a metric range on a scale of 0, where 0 is least like target video resume 108, to 10, where 10 is exact same as target video 108. It could also include a range of percentages and may cover any suitable range or rating score. In some cases, determining duplication coefficient 156 for target resume video 108 may include linear regression analysis, machine-learning process, and the like. For example, duplication coefficient 156 may be calculated by using classifier 152 configured to output at least a datum that labels or otherwise identifies a set of data that are clustered together, found to be close under a distance metric. Additionally, or alternatively, duplication coefficient 156 may be an output of a machine-learning module 144 that generates classifier 152 using a classification algorithm.

Still referring to FIG. 1, computing device may utilize duplication coefficient 156 in determining which video resumes have value for storage purposes. Duplication coefficient 156 may be used to measure the quantity of video resumes matching video elements of target video resume 108. Duplication coefficient 156 may be used to select subject-specific data among existing video resumes 112 and match the elements therein to give a range of similarity among all videos. For example, duplication coefficient 156 may be the metric range of similarity between existing video resumes 112 based on image component 116a, audio component, non-verbal content 132, or verbal content 136. Computing device 104 may take duplication coefficient of video resumes 112 image components 116a and compare to image component 116b of target video resume and give a percentage or other numeric value illustrating video resumes 112 image components that are most similar to target video resume 108 image component 116b. Computing device 104 may utilize the duplication coefficient to disregard, delete, flag, video resumes 112 based on a threshold requirement set by the user or subject 120. For example, a user may set computing device 104 to disregard all video resumes with attributes 124 dissimilar to target video resume 108. A user could set computing 104 to delete video resumes 112 that that have an audio competent less than 50% similar to target video resume 108 audio component. Computing device 104 may be set to flag video resumes 112 that are missing and image or audio component in the video file.

Still referring to FIG. 1, computing device 104 may utilize the duplication coefficient to output indications regarding video resume to a user, such as without limitations indications identifying flagged, matching, nonrelevant, and/or duplicative video resumes 112. Indications may alternatively or additionally display a degree of similarity to another video and/or video resume, may list one or more video resumes found to be similar as a function of duplication coefficient, or the like. In some cases, computing device 104 may utilize the duplication coefficient to automatically reject video resumes, or lower overall subject's 120 score, or other scores that measures subject's 120 desirability as an employee, for instance and without limitation based on a threshold requirement of target video resume 108. For example, duplication coefficient 156 may be part of a scoring system that generates a score by an algorithm based on user data records. Scoring system may include, without limitation, a career scoring system producing dynamic rating that represent, for instance in the form of a numerical score, a degree of employability, suitability for a job, and the like. Additional disclosure related to the scoring system of subject 120 may be found in U.S. patent application Ser. No. 17/486,461 entitled "SYSTEMS AND METHODS FOR SCORE GENERATION FOR APPLICANT TRACKING CROSS-REFERENCE TO RELATED APPLICATIONS" by W. Inman et al., which is incorporated in its entirety herein by reference.

Figure 2:
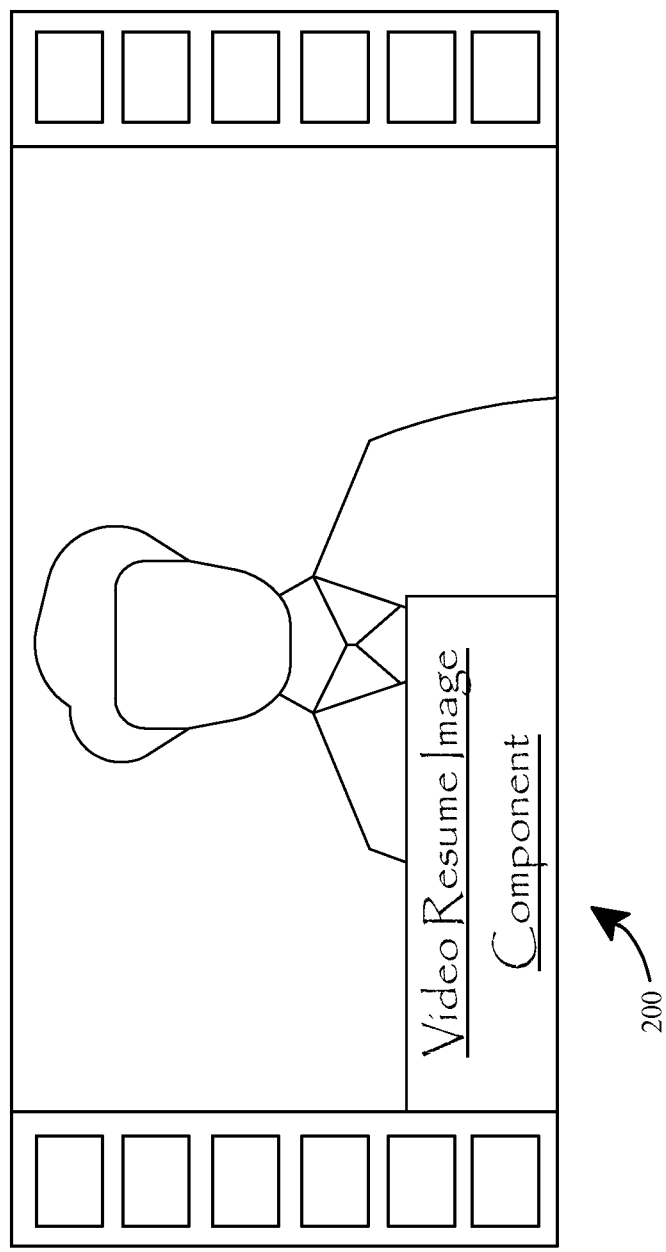
FIG. 2 illustrates an exemplary image frame.

Referring now to FIG. 2, an exemplary frame of a video resume 200 is illustrated. Frame may include at least a portion of an image component. In some cases, a video resume may include many frames, for instance at a frame rate (e.g., 24, 30, 60, or 120 frames per second), thereby facilitating video.

With continued reference to FIG. 2, frame may include an image of subject. Alternatively, or additionally, in some cases video resume may include images of other people or no person at all. An image of subject may be included in video resume.

Still referring to FIG. 2, as more potential employees become more literate with video communication, video communication within a work environment may gain in popularity. Sharing one's accomplishments and advertising one's services represents an important application of communication for an individual jobseeker. As jobseekers gain in ability and confidence in video communication, they will choose to put their best foot forward using the medium they believe best facilitates advantageous communication. As a result, some embodiments of the present disclosure inventively anticipate that video resumes will gain in popularity and address an unmet need associated with video resumes. Presently, employers can screen many written resumes automatically. However, this technology cannot be used with video resumes. In some case, embodiments described herein improve upon present resume screening systems by allowing the automatic parsing and correlating of video resumes.

Figure 3:
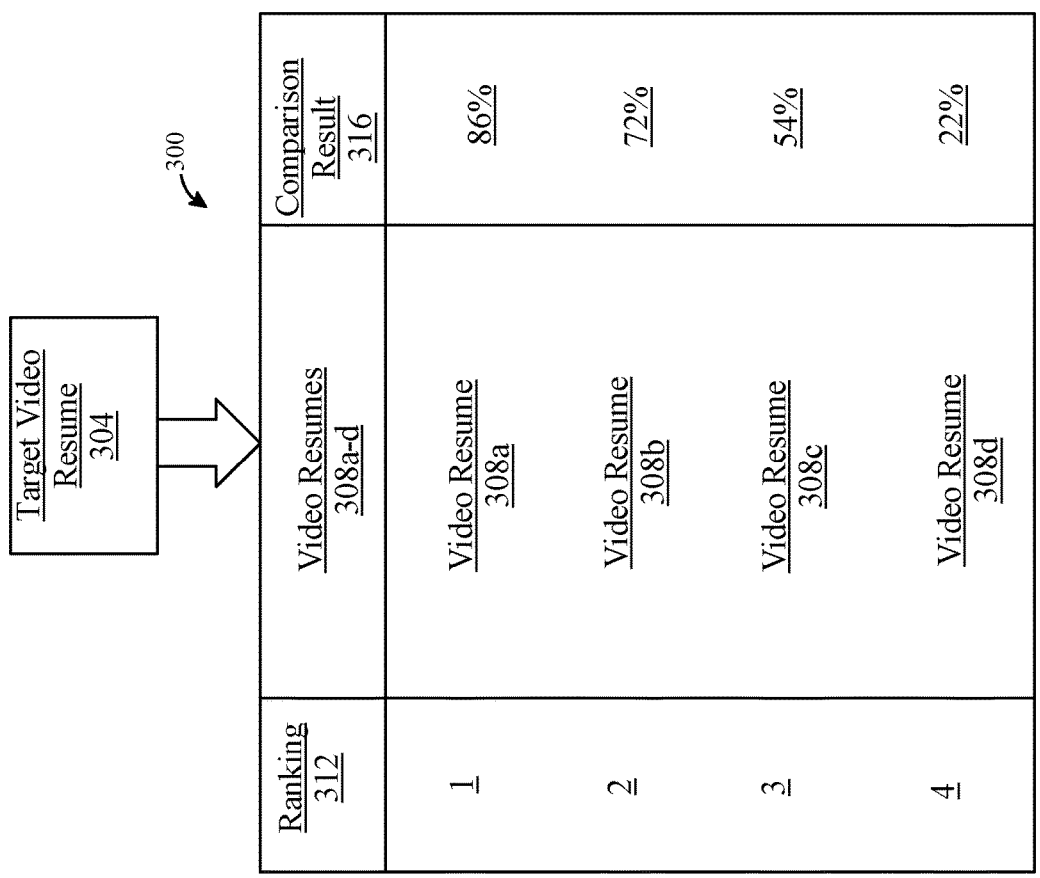
FIG. 3 is a table representing an exemplary association between multiple video resumes and a target video resume.

Referring now to FIG. 3, a table 300 is depicted that illustrates an association between target video resume 304 and plurality of existing video resumes 308a-d. Table 300 illustrates an image component of target video resume 304 being associated with plurality of existing video resumes 308a-d.

With continued reference to FIG. 3, table 300 may include a few columns, for example a ranking column, video resume 308a-d column, and a factor (e.g., comparison result 316) column. Table 300 may include more than one factor column corresponding to other factors. For example, relevance, audio, text, video frame rate, and the like. Ranking 312 may include a ranking of video resumes 308a-d, for example from most similar to target resume video resume 304, video resume 308a, to a least similar, video resume 308d.

Figure 4:
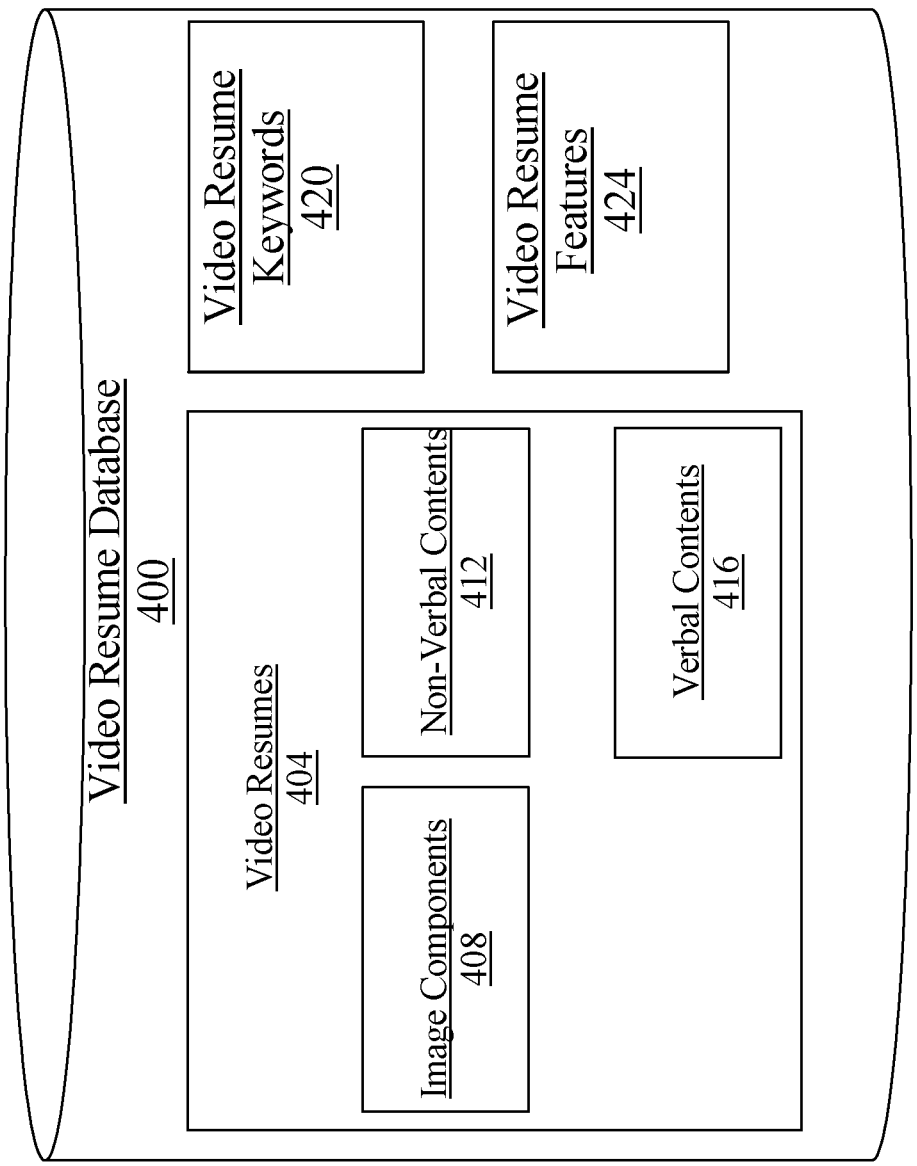
FIG. 4 illustrates an exemplary video resume database using a block diagram.

Referring now to FIG. 4, an exemplary video resume database 400 is illustrated by way of a block diagram. Computing device 104 may be communicatively connected with video resume database 400. For example, in some cases, video resume database 400 may be local to computing device 104. Alternatively, or additionally, in some cases, video resume database 400 may be remote to computing device 104 and communicative with computing device 104 by way of one or more networks. As used in this disclosure, "video resume database" is a data structure configured to store data associated with a plurality of video resumes 404. In some cases, data within video resume database 400 may be labeled to indicate which video resume 404 is associated with the data, for instance with a unique video resume identification number. Video resume database 400 may store a plurality of video resumes 404. Video resumes 404 may be uploaded to video resume database 400 from at least a remote device. Remote device may include any computing device described in this disclosure. As described above with reference to FIG. 1, video resumes 404 may include image components 408, non-verbal contents 412, and/or verbal contents 416. Additionally, video resume database 400 may include video resume keywords 420. As described above, video resume keywords 420 may be include words that were represented verbally within video resume 404. Alternatively, or additionally, video resume keywords 420 may be associated and/or classified to video resume 404 from non-verbal content 412 or through user entry. Video resume database 400 may additionally store video resume features 424 associated with video resumes 404. As described above, video resume features 424 may be recognized or extracted from video resumes 404 associated with a subject by way of a number of processes described in detail in this disclosure.

Figure 5:
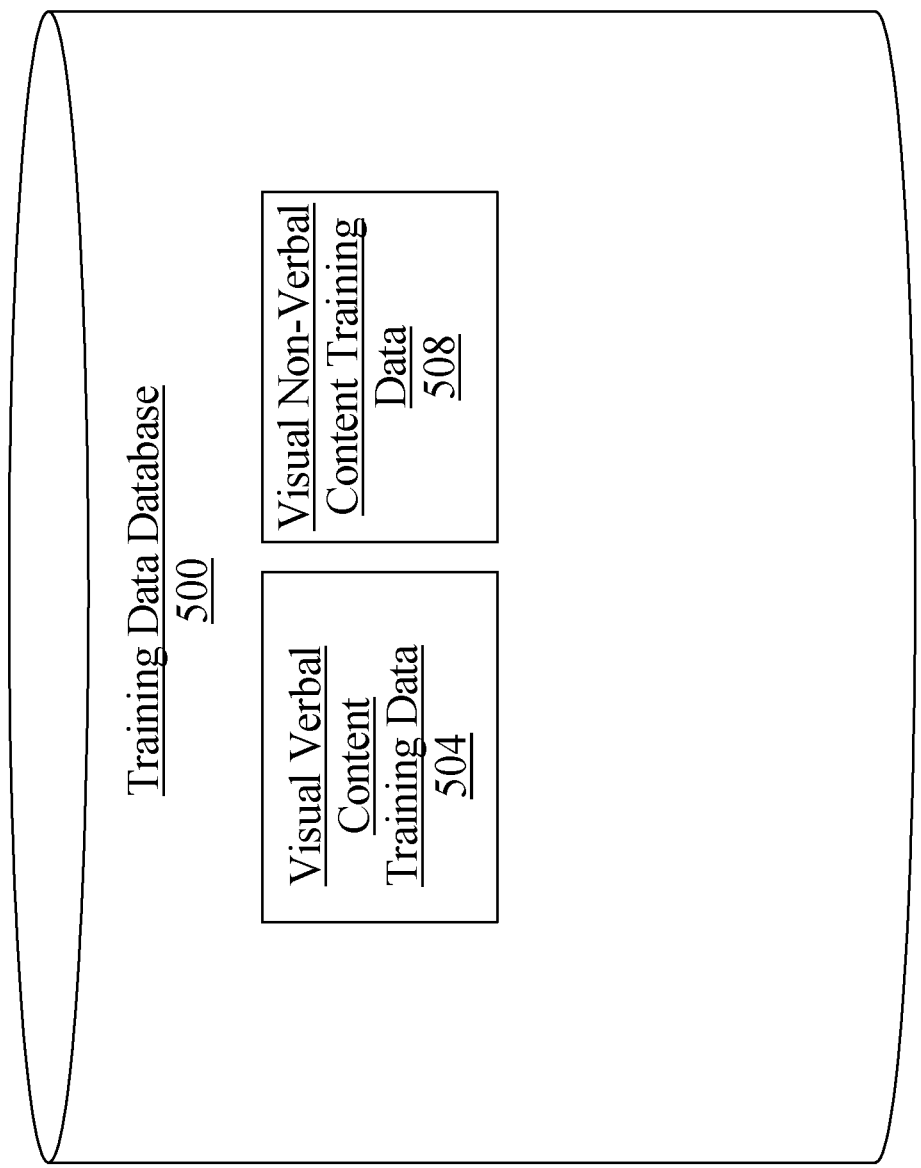
FIG. 5 illustrates by way of a block diagram an exemplary training data database.

Referring now to FIG. 5, a training data database 500 is illustrated by way of a block diagram. Computing device 104 may be communicatively connected with video resume database 400. For example, in some cases, training data database 500 may be local to computing device 104. Alternatively, or additionally, in some cases, training data database 500 may be remote to computing device 104 and communicative with computing device 104 by way of one or more networks. As used in this disclosure, "training data database" is a data structure configured to store training data. As described in this disclosure, many embodiments may use training data to perform any number of processes. Training data may, in some cases, need to be used, re-used, modified, deleted, and the like. In some cases, training data may need to be conditionally selected. Additionally, training data sets may be stored in training data database 500. For example, in some cases, training data that may be used to extract data (e.g., keywords and/or features), for example from video resumes may be stored in training data database 500; these training sets may include without limitation visual verbal content training data 504, visual non-verbal content training data 508.

Figure 6:
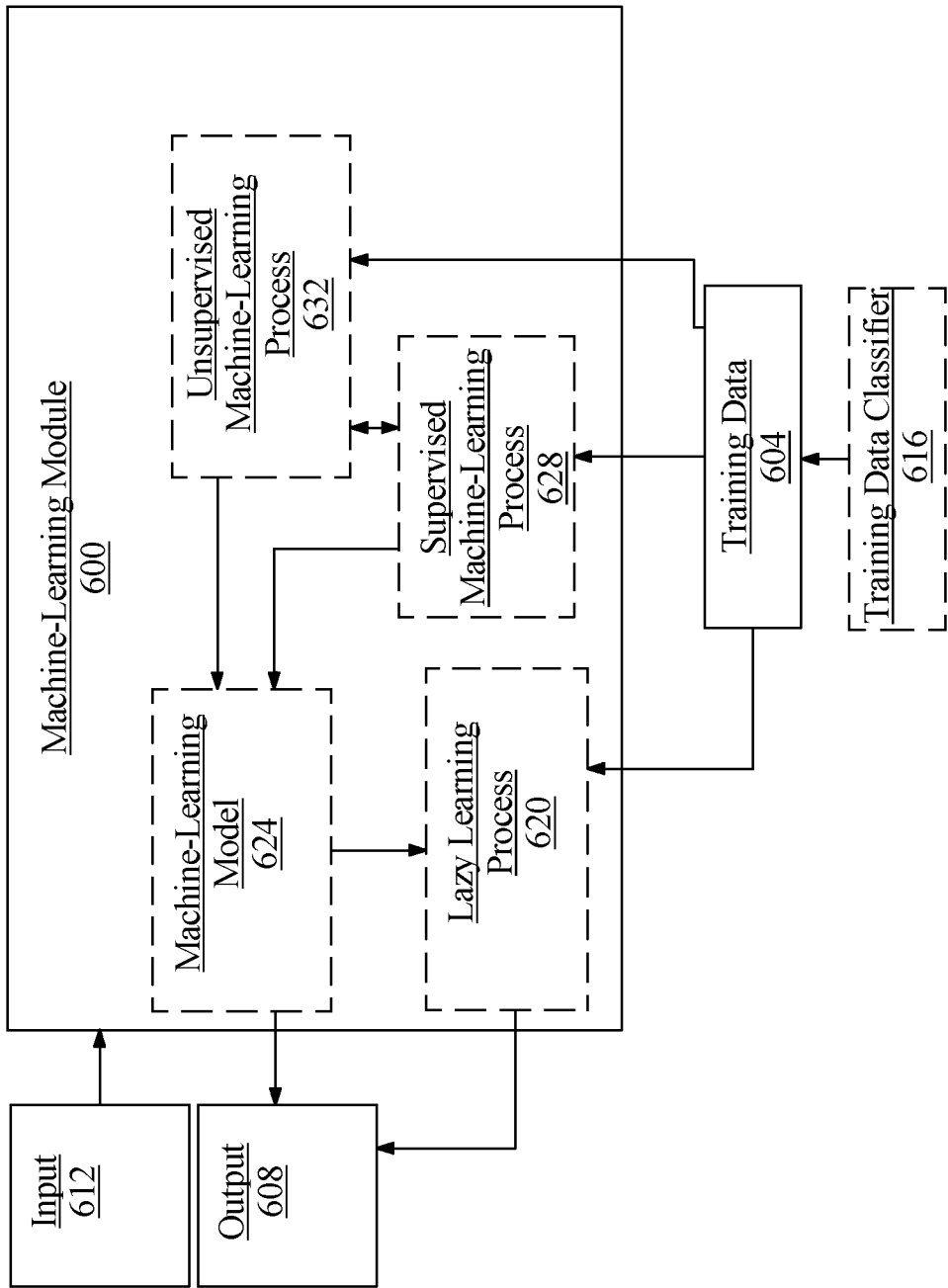
FIG. 6 is a block diagram of exemplary machine-learning processes.

Referring now to FIG. 6, an exemplary embodiment of a machine-learning module 600 that may perform one or more machine-learning processes as described in this disclosure is illustrated. Machine-learning module 600 may perform determinations, classification, and/or analysis steps, methods, processes, or the like as described in this disclosure using machine learning processes. A "machine learning process," as used in this disclosure, is a process that automatedly uses training data to generate an algorithm that will be performed by a computing device/module to produce outputs given data provided as inputs; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input 612 data as described in this disclosure to any output 608 data as described in this disclosure. As a non-limiting illustrative input may include subject-specific data and outputs may include description-specific data.

Further referring to FIG. 6, training data 604 may be filtered, sorted, and/or selected using one or more supervised and/or unsupervised machine-learning processes 632 and/or models as described in further detail below; such models may include without limitation a training data classifier 616. Training data classifier 616 may include a "classifier," which as used in this disclosure is a machine-learning model 624 as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output 608 at least a datum that labels or otherwise identifies a set of data that are clustered together, found to be close under a distance metric as described below, or the like. Machine-learning module 600 may generate a classifier using a classification algorithm, defined as a process whereby a computing device and/or any module and/or component operating thereon derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of training data 604 to according to fields of target video resume for instance, title, role, organization, requisite experience, requisite credentials, and the like.

Still referring to FIG. 6, machine-learning module 600 may be configured to perform a lazy-learning process and/or protocol, which may alternatively be referred to as a "lazy loading" or "call-when-needed" process and/or protocol, may be a process whereby machine learning is conducted upon receipt of an input 612 to be converted to an output 608, by combining the input 612 and training set to derive the algorithm to be used to produce the output 608 on demand. For instance, an initial set of simulations may be performed to cover an initial heuristic and/or "first guess" at an output and/or relationship. As a non-limiting example, an initial heuristic may include a ranking of associations between inputs and elements of training data. Heuristic may include selecting some number of highest-ranking associations and/or training data elements. Lazy learning 620 may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 6, machine-learning processes as described in this disclosure may be used to generate machine-learning models. A "machine-learning model," as used in this disclosure, is a mathematical and/or algorithmic representation of a relationship between inputs and outputs, as generated using any machine-learning process including without limitation any process as described above and stored in memory; an input 612 is submitted to a machine-learning model 624 once created, which generates an output 608 based on the relationship that was derived. For instance, and without limitation, a linear regression model, generated using a linear regression algorithm, may compute a linear combination of input 612 data using coefficients derived during machine-learning processes to calculate an output datum. As a further non-limiting example, a machine-learning model may be generated by creating an artificial neural network, such as a convolutional neural network comprising an input 612 layer of nodes, one or more intermediate layers, and an output 608 layer of nodes. Connections between nodes may be created via the process of "training" the network, in which elements from a training data 804 set are applied to the input 612 nodes, a suitable training algorithm (such as Levenberg-Marquardt, conjugate gradient, simulated annealing, or other algorithms) is then used to adjust the connections and weights between nodes in adjacent layers of the neural network to produce the desired values at the output 608 nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include subject-specific data as described above as inputs, description-specific data as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process 632, as used herein, is a process that derives inferences in datasets without regard to labels; as a result, an unsupervised machine-learning process 632 may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 7:
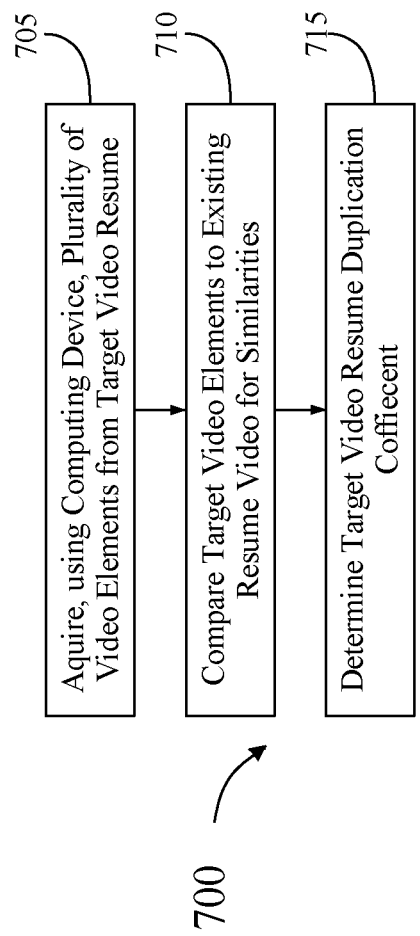
FIG. 7 is a flow diagram of an exemplary method of parsing and comparing solicitation video resume content to target video resume.

Referring now to FIG. 7, an exemplary method of parsing and comparing resume video duplications is illustrated by way of a flow diagram. At step 705, method may include acquiring, using a computing device, a plurality of video elements from a target video resume. This may be accomplished without limitation as described above in reference to FIGS. 1-6, wherein target video includes at least an image component. In some cases, image component may include non-verbal or verbal content, for example with reference to FIG. 1. Computing device may include any computing device as described in this disclosure, for example with reference to FIGS. 1 and 4-6. Target video resume may include any target video resume described in this disclosure, for example with reference to FIGS. 1-6. Subject may include any subject described in this disclosure, for example with reference to FIG. 1.

With continued reference to FIG. 7, at step 710, method may include comparing, using a computing device, at least an existing video resume and the target video resume video resume for similarities. Existing video resume may be any video resume as described above in reference to FIGS. 1 and 4. In some cases, computing device may obtain a comparison result of video resume and target video resume. The comparison result may contain a comparison score that represents a degree of similarity between target video resume and an existing video resume of the plurality of existing video resumes, as described with reference to FIGS. 1 and 3. In some cases, the comparison score may be determined by dynamic time warping based on a similarity matrix, as disclosed in FIG. 1. As a function of the comparison result, a ranking of the plurality of existing resume videos is may be generated. In some cases, generating the ranking of the plurality of existing resumes may include linear regression techniques, as disclosed in FIG. 1.

With continued reference to FIG. 7, at step 715 method may include determining, using computing device, as a function of the comparison result, a duplication coefficient for target resume video, wherein the duplication coefficient relates to a similarity between target video resume and at least an existing resume video, as disclosed in FIG. 1. Duplication coefficient may represent any quantitative value as disclosed in FIG. 1 and may be calculated through a computing device or machine-learning process as disclosed in FIG. 1.

With continued reference to FIG. 7, in some embodiments, method 700 may include associating, using computing device, video resume with target video resume as a function of at least a keyword, as described with reference to FIG. 1. In some embodiments, method may additionally include classifying, using computing device and at least a candidate classifier, video resume to the target video resume. Candidate classifier may include any classifier described in this disclosure, for example including with reference to FIG. 1. In some embodiments, method 700 may additionally include querying, using computing device, a video resume with at least a keyword. In some embodiments, method 700 may additionally include determining relevance as a function of association between video resume and target video resume, for example including with reference to FIGS. 1 and 3.

Still referring to FIG. 7, in some embodiments, at least an image component may include visual non-verbal content related to at least an attribute of subject. Visual non-verbal content may include any visual non-verbal content described in this disclosure, for example including with reference to FIG. 1. Attribute may include any attribute described in this disclosure, for example including with reference to FIG. 1. In some cases, method 700 may additionally include recognizing, using computing device, at least a feature as a function of visual non-verbal content and associating, using the computing device, subject with target video resume as a function of the at least a feature. Feature may include any feature described in this disclosure, for example including with reference to FIG. 1. In some cases, recognizing at least a feature and associating video resume with target video resume as a function of the at least a feature may use a machine-learning process. Machine-learning process may include any machine learning process described in this disclosure, for example including with reference to FIGS. 1 and 5-6.

Still referring to FIG. 7, in some embodiments at least an image component may include visual verbal content. In some cases, method 700 may additionally include recognizing, using computing device, at least a keyword as a function of visual verbal content and associating, using the computing device, video resume with target video resume as a function of the at least a keyword. Visual verbal content may include any visual verbal content described in this disclosure, for example including with reference to FIG. 1.

Still referring to FIG. 7, in some embodiments at least an audio component may include audible non-verbal content related to at least an attribute of subject. Audible non-verbal content may include any audible non-verbal content described in this disclosure, for example including with reference to FIG. 1. In some cases, method 700 may additionally include recognizing, using computing device, at least a feature as a function of audible non-verbal content and associating, using the computing device, video resume with target video resume as a function of the at least a feature.

Figure 8:
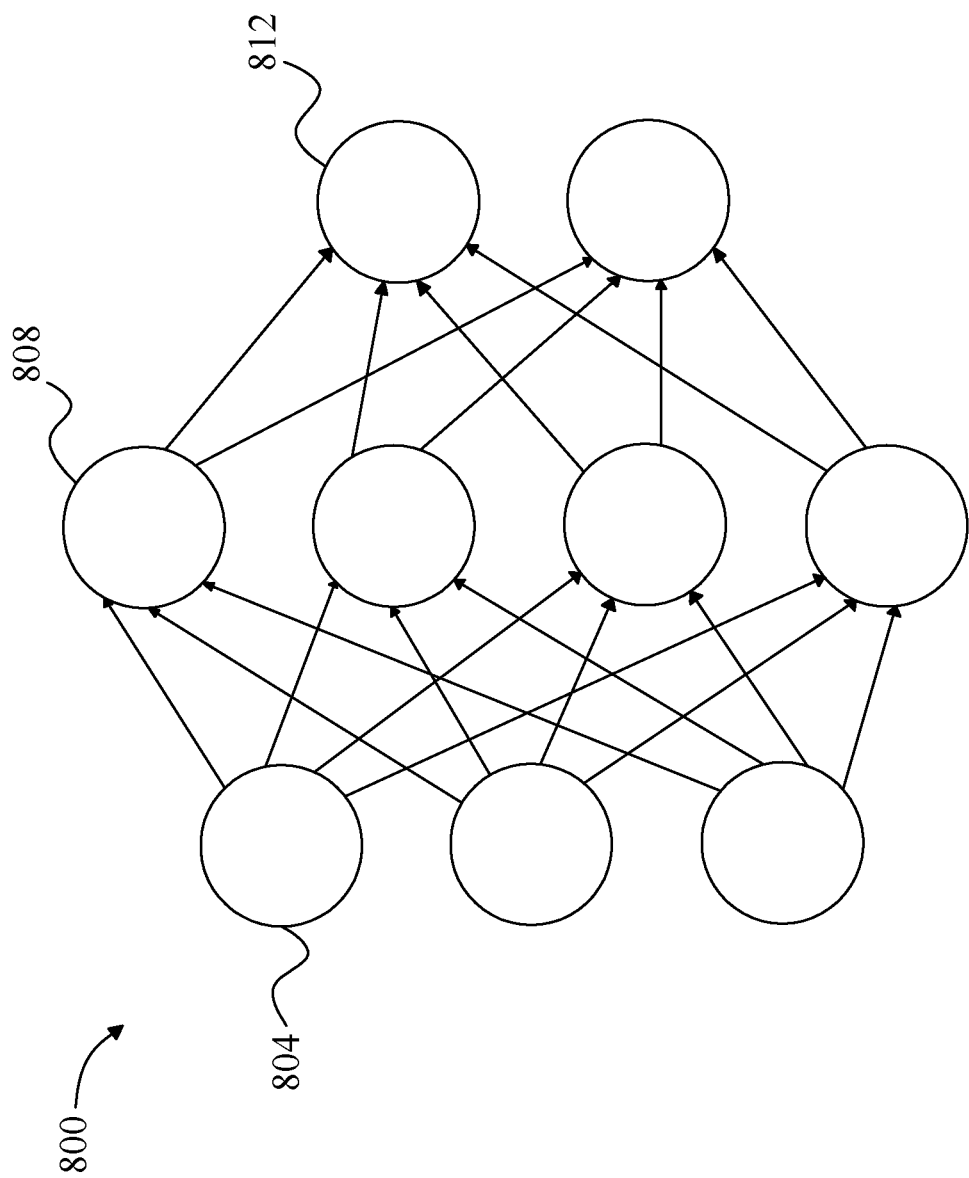
FIG. 8 illustrates an exemplary embodiment of a neural network.

Referring now to FIG. 8, an exemplary embodiment of neural network 800 is illustrated. A neural network 800 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 9:
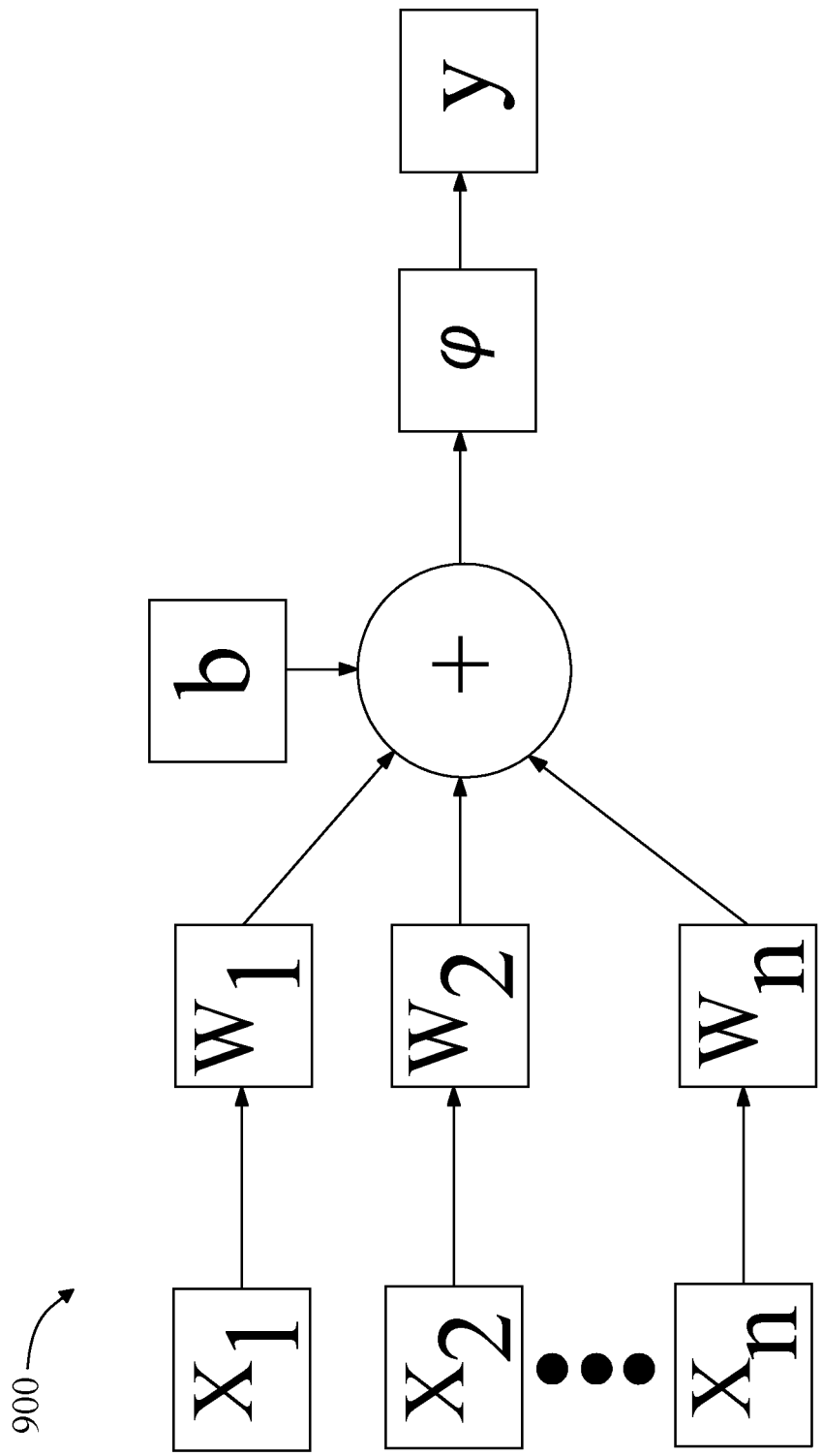
FIG. 9 is a block diagram of an exemplary embodiment of a node of a neural network.

Referring now to FIG. 9, an exemplary embodiment of a node of a neural network is illustrated. A node may include, without limitation a plurality of inputs xi that may receive numerical values from inputs to a neural network containing the node and/or from other nodes. Node may perform a weighted sum of inputs using weights wi that are multiplied by respective inputs xi. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight wi applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights wi may be determined by training a neural network using training data, which may be performed using any suitable process as described above.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
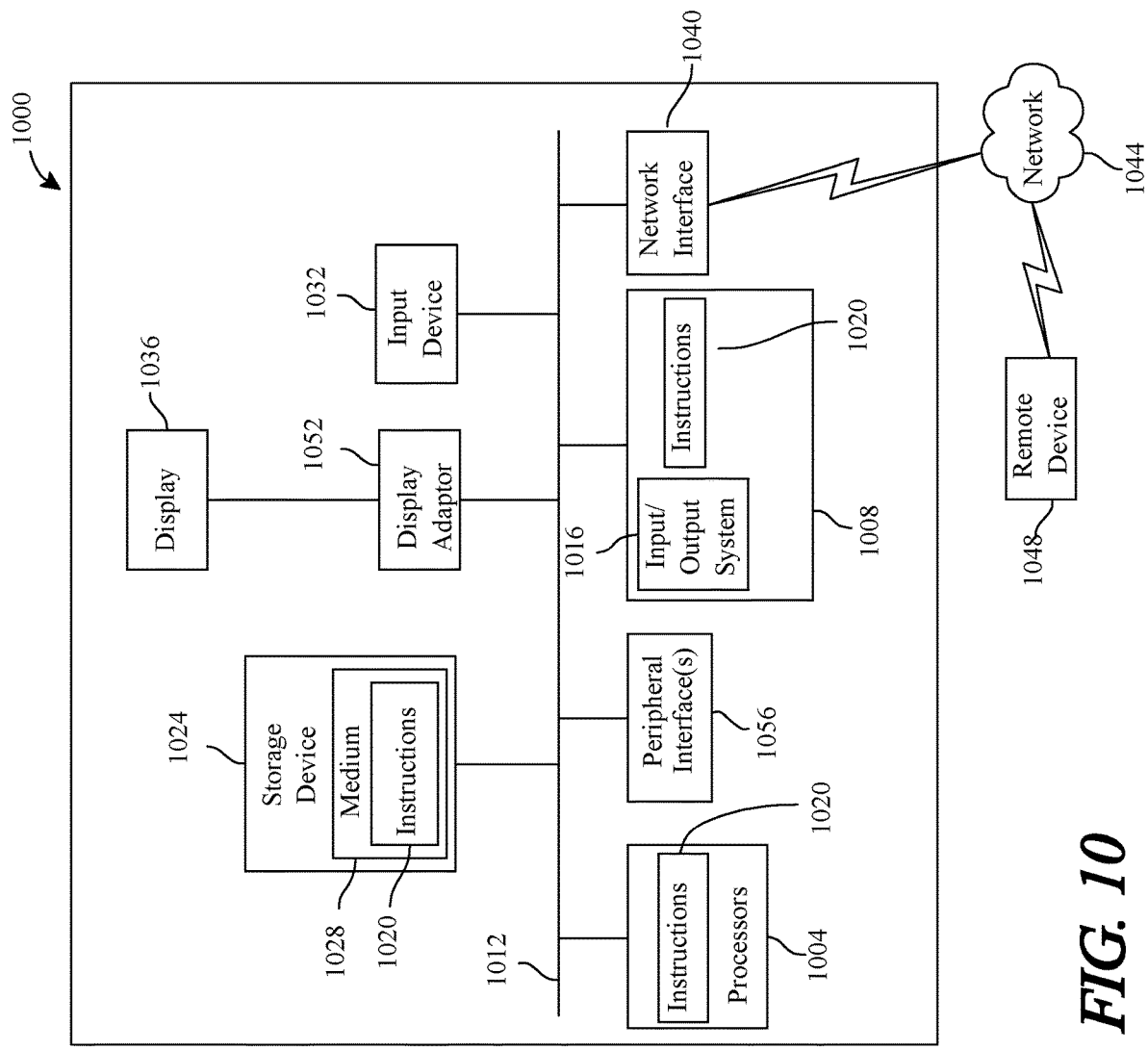
FIG. 10 is a block diagram of a computing apparatus that can be used to implement any one or more of the methodologies disclosed herein and any one or more portions thereof.

FIG. 10 shows a diagrammatic representation of one embodiment of a computing device in the exemplary form of a computer apparatus 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer apparatus 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer apparatus 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer apparatus 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer apparatus 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer apparatus 1000. In one example, software 1020 may reside, completely or partially, within machine-readable medium 1028. In another example, software 1020 may reside, completely or partially, within processor 1004.

Computer apparatus 1000 may also include an input device 1032. In one example, a user of computer apparatus 1000 may enter commands and/or other information into computer apparatus 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer apparatus 1000 via storage device 1024 (e.g., a removable disk drive, a flash drive, etc.) and/or network interface device 1040. A network interface device, such as network interface device 1040, may be utilized for connecting computer apparatus 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer apparatus 1000 via network interface device 1040.

Computer apparatus 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer apparatus 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for parsing and comparing resume video duplications, the apparatus comprising:
   at least a processor; and
   a memory communicatively connected to the processor, the memory containing instructions configuring the at least a processor to:
   decode a target video resume wherein decoding the target video resume further comprises identifying a plurality of reference frames;
   parse a plurality of reference frames of the target video resume for a plurality of video elements;
   acquire the plurality of video elements from the target video resume, wherein the target video resume comprises at least an image component;
   compare at least an existing video resume and the target video resume to obtain a comparison result;
   determine, as a function of the comparison result, a duplication coefficient for the target resume video, wherein the duplication coefficient relates to a similarity between the target video resume and at least an existing resume video; and
   flagging, as a function of the duplication coefficient and the at least an existing resume video, the target resume video.

2. The apparatus of claim 1, wherein acquiring the plurality of video elements comprises:
   identifying a series of reference frames of the target video resume;
   identifying a corresponding series of reference frames of at least an existing video resume; and
   comparing the series of reference frames of the target video resume to the existing resume video.

3. The apparatus of claim 1, wherein comparing at least an existing video resume and the target video resume further comprises selecting at least an existing video resume using at least identifying indicia related to the target video resume.

4. The apparatus of claim 1, wherein the comparison result includes a comparison score that represents a degree of similarity between the target video resume and an existing video resume of the plurality of existing video resumes.

5. The apparatus of claim 4, wherein the comparison score is determined by dynamic time warping on the basis of a similarity matrix.

6. The apparatus of claim 1, wherein, as a function of the comparison result, a ranking of the plurality of existing resume videos is generated.

7. The apparatus of claim 6, wherein ranking resume videos comprises linear regression techniques.

8. The apparatus of claim 7, wherein the linear regression techniques comprise linear regression models comprising at least ordinary least squares regression.

9. The apparatus of claim 1, wherein the duplication coefficient comprises linear regression analysis.

10. A method of parsing and comparing resume video duplications,
    using a computing device, the method comprising:
    decoding a target video resume wherein decoding the target video resume further comprises identifying a plurality of reference frames;
    parsing a plurality of reference frames of the target video resume for a plurality of video elements;
    acquiring a plurality of video elements from a target video resume, wherein the target video comprises at least an image component;
    comparing, using the computing device, at least an existing video resume and the target video resume to obtain a comparison result;
    determining, using the computing device, as a function of the comparison result, a duplication coefficient for the target resume video, wherein the duplication coefficient relates to a similarity between the target video resume and at least an existing resume video; and flagging, using the computing device, the target resume video as a function of the duplication coefficient and the at least an existing resume video.

11. The method of claim 10, wherein acquiring the plurality of video elements comprises:
   identifying a series of reference frames of the target video resume;
   identifying a corresponding series of reference frames of at least an existing video resume; and
   comparing the series of reference frames of the target video resume to the existing resume video.

12. The method of claim 10, wherein comparing at least an existing video resume and the target video resume further comprises selecting at least an existing video resume using at least identifying indica related to the target video resume.

13. The method of claim 10, wherein the comparison result includes a comparison score that represents a degree of similarity between the target video resume and an existing video resume of the plurality of existing video resumes.

14. The method of claim 10, wherein the comparison score is determined by dynamic time warping based on a similarity matrix.

15. The method of claim 10, wherein, as a function of the comparison result, a ranking of the plurality of existing resume videos is generated.

16. The method of claim 15, wherein ranking video resumes comprises linear regression techniques.

17. The method of claim 16, wherein the linear regression techniques comprise linear regression models comprising at least ordinary least squares regression.

18. The method of claim 10, wherein the duplication coefficient comprises linear regression analysis.

\* \* \* \* \*